(12) United States Patent
Souders et al.

(10) Patent No.: US 10,339,538 B2
(45) Date of Patent: Jul. 2, 2019

(54) METHOD AND SYSTEM FOR GENERATING RECOMMENDATIONS

(75) Inventors: Steven K. Souders, Los Altos, CA (US); Lars P. Nilsen, Santa Cruz, CA (US); Scott A. Gatz, San Francisco, CA (US); Ashvinkumar P. Patel, Los Altos Hills, CA (US)

(73) Assignee: OATH INC., New York, NY (US)

( * ) Notice: Subject to any disclaimer, the term of this patent is extended or adjusted under 35 U.S.C. 154(b) by 2169 days.

(21) Appl. No.: 10/789,869

(22) Filed: Feb. 26, 2004

(65) Prior Publication Data

US 2005/0193002 A1    Sep. 1, 2005

(51) Int. Cl.
    *G06Q 30/02* (2012.01)
(52) U.S. Cl.
    CPC ......... *G06Q 30/02* (2013.01); *G06Q 30/0271* (2013.01)
(58) Field of Classification Search
    CPC ........... G06Q 30/0631; G06Q 30/0271; G06Q 30/0269
    USPC ....................................................... 705/26.7
    See application file for complete search history.

(56) References Cited

U.S. PATENT DOCUMENTS

| | | | | |
|---|---|---|---|---|
| 6,236,978 B1 * | 5/2001 | Tuzhilin | ............... | G06Q 30/018 705/14.25 |
| 6,334,127 B1 * | 12/2001 | Bieganski | .............. | G06Q 30/02 |
| 6,370,513 B1 * | 4/2002 | Kolawa | ................. | G06Q 30/02 705/15 |
| 6,853,982 B2 | 2/2005 | Smith et al. | | |

(Continued)

FOREIGN PATENT DOCUMENTS

| | | |
|---|---|---|
| JP | 2001-350875 | 12/2001 |
| JP | 2003-0167901 | 6/2003 |

(Continued)

OTHER PUBLICATIONS

John V. Petersen, Absolute Beginner's Guide to Databases, Que Publishing, 2002, Chapter 6.*

(Continued)

*Primary Examiner* — John Van Bramer
*Assistant Examiner* — Brendon Beheshti
(74) *Attorney, Agent, or Firm* — James J. DeCarlo; Greenberg Traurig, LLP

(57) ABSTRACT

A method and system for generating recommendations across multiple product or service domains are disclosed. The system includes a plurality of domain servers for handling user events and for interfacing with users via the Internet, a database for storing the user events, and a recommendation engine. The recommendation engine further includes one or more computer programs containing instructions for collecting the user events across a plurality of product or service domains in the database, receiving a triggering event for recommendations, analyzing the user events to formulate correlations between the user events in the database, and generating recommendations in response to the triggering event in accordance with the correlations between the user events in the database. The disclosure uses user input data from different domains for producing recommendations in any of those domains. The disclosure allows for access to a greater amount of user input data which in turn improves the quality of recommendations.

20 Claims, 5 Drawing Sheets

User Database 114

| userid | domain | itemid | event type | event value |
|---|---|---|---|---|
| User 1 | News | ne84938 | view_entire_article | yes |
| User 1 | Movies | mo3844 | rate | 80 |
| User 1 | Movies | mo3844 | review | This movie is ... |
| User 1 | Shopping | sh74399 | purchase | 119 |
| User 1 | Shopping | sh74399 | rate | high |
| User 2 | : | : | : | : |
| : | | | | |
| User n | | | | |

(56) References Cited

U.S. PATENT DOCUMENTS

| | | | |
|---|---|---|---|
| 6,873,996 B2 | 3/2005 | Chand | |
| 2002/0010625 A1* | 1/2002 | Smith | G06Q 30/02 705/14.52 |
| 2002/0040395 A1* | 4/2002 | Davis | G06F 16/9535 709/224 |
| 2002/0078191 A1* | 6/2002 | Lorenz | H04L 29/06 709/223 |
| 2002/0082901 A1* | 6/2002 | Dunning | G06Q 30/02 705/26.63 |
| 2002/0111865 A1* | 8/2002 | Middleton, III | G06Q 30/02 705/14.41 |
| 2004/0076936 A1* | 4/2004 | Horvitz | G06Q 30/02 434/236 |
| 2004/0172267 A1* | 9/2004 | Patel | G06Q 10/0635 705/7.29 |

FOREIGN PATENT DOCUMENTS

| | | | | |
|---|---|---|---|---|
| KR | 10-2002-0037980 | | 5/2002 | |
| WO | WO 2001/015449 | * | 1/2001 | H04N 7/173 |

OTHER PUBLICATIONS

Microsoft Technet, Invalid value. (available at: http://technet.microsoft.com/en-us/library/ms165298(v=sql.90).aspx).*
Dictionary.com, Dynamic. (available at: http://dictionary.reference.com/browse/dynamic).*
Wikipedia, Network domain (Year: 2019).*
Wikipedia, ASP.net (Year: 2019).*
Roberts et al., ASP.net Up Close, InformIT. p. 6, Server-Side Rendering section. Dec. 6, 2001 (Year: 2001).*
Ansari, Asim et al. (2000). "JMR, Journal of Marketing Research. Chicago:", 37(3): 31 pgs.
Mild, Andreas et al. (2002). "Collaborative filtering or regression models for internet recommendation systems?", *Journal of Targeting Measurement and Analysis for Marketing*, 10(4): 304-313.
Adomavicius, Gediminas et al. *Recommendation Technologies: Survey of Current Methods and Possible Extensions*, 39 pgs.
Breese, John S. et al. (1998). "Empirical Analysis of Predictive Algorithms for Collaborative Filtering", *Technical Report MSR-TR-98-12, Microsoft Research, Microsoft Corporation*, 20 pgs.
Maxwell, David et al. (1997). "A Bayesian Approach to Learning Bayesian Networks with Local Structure", *Technical Report MSR-TR-97-07, Microsoft Research, Microsoft Corporation*, 19 pgs.
Avery, Christopher et al. (1999) "The Market for Evaluations", *Americal Ecnomic Review*, 89(3): 564-584, 38 pgs.
The Examiner's Final Rejection dated Oct. 27, 2008, for Korean Patent Application No. 10-2006-7019742, filed on Feb. 25, 2005, four pages.
International Search Report and Written Opinion dated Sep. 13, 2007, for PCT Application No. PCT/US05/06170 filed Feb. 25, 2005, 8 pages.
International Preliminary Report on Patentability, dated Sep. 13, 2007, for PCT Application No. PCT/US2005/006170 filed on Feb. 25, 2005, four pages.
Notice of Preliminary Rejection dated Mar. 14, 2008 for Korean Application No. 10-2006-7019742, filed on Feb. 25, 2005, five pages.
Notice of Preliminary Rejection dated Mar. 14, 2008 for Korean Application No. 10-2006-7019742, filed on Feb. 25, 2005, five pages. (English Translation).
Notice of Preliminary Rejection and English Translation dated Jul. 2, 2009 for Korean Application No. 10-2009-7004154, filed on Feb. 25, 2005, ten pages.

* cited by examiner

METHOD AND SYSTEM FOR GENERATING RECOMMENDATIONS

FIELD OF THE INVENTION

The present invention relates to the field of Internet applications. In particular, the present invention relates to a method and system for generating product or service recommendations using user input data from multiple domains.

BACKGROUND OF THE INVENTION

Recommendations are one of the strongest ways that people search for and find what they want. Whether shopping for a camera or trying to find a restaurant, people rely on getting recommendations from a variety of sources such as friends, experts, and publications.

Research in computer-generated recommendations has been active for decades and has resulted in a large amount of publications and various approaches, as well as many working systems with a range of successes. Computer-generated recommendations can be based on the codification of expertise from various sources. This was evidenced in the 1970s and 80s through the glut of expert system-based applications. The problem with this approach is the effort and difficulty in capturing and maintaining expertise in a computer application.

An alternative approach that addresses some of the drawbacks of expert systems are machine learning systems where the computer application can improve its own performance by adapting itself based on past performance. With regards to recommendations, this approach is manifested in the form of collaborative filtering algorithms.

Collaborative filtering bases recommendations on the experiences of other users. When faced with a decision in a particular domain people often consult with friends who have experiences in that domain. Collaborative filtering is a way to build those recommendations across a larger group of users, beyond just friends and acquaintances. The approach takes as input the feedback of these users in the form of reviews, scores, ranks, votes, etc. This input data is analyzed to find patterns and correlations between users and items that translate into probabilities of success of the recommendations.

A well known personalized movie recommendation website that uses collaborative filtering is MovieLens (http://www.movielens.com). In this personalized movie recommendation service, thousands of users submit scores for movies based on how well they liked or disliked the movies. Recommendations for a specific user can be made by looking at movies that are similar to movies liked by the user. This provides the recommendations of the type, "people who like this movie also like the following movies." For example, a user who is looking at the movie *Jerry Maguire* may get a movie recommendation for *A Few Good Men*. In this case "similar" is based on the analysis of scores across the entire user population who has scored movies that intersect with the movies scored by the specific user requesting recommendations.

As illustrated in the above example, existing systems in the area of collaborative filtering have focused on making recommendations based on users' input data within a single domain. Since the input data is gathered only from a single domain, for example movies, the recommendations can be generated for items within this domain. Furthermore, the quality of collaborative filtering recommendations is dependent on the amount of user input data that is available. But if there is little data available in one domain, the recommendations generated are less relevant and less confident.

Therefore, there is a need for a system and method that can address the problems of making recommendations based on data collected from a single domain. In particular, there is a need for a system and method for using user input data from multiple domains in making product or service recommendations.

SUMMARY

The invention discloses a system and method that uses user input data across multiple domains for generating product or service recommendations. This invention provides multiple improvements over existing systems.

First, this invention is advantageous for organizations whose business interests cross domains. The recommendations are not limited to a single domain. Instead, user events from different domains can be leveraged for producing recommendations in any of those domains. For example, by analyzing a user's feedback across shopping, news and movies, the system can recommend skateboarding movies to the user who had shopped for skateboards or read news articles about skateboarding.

In addition, this invention allows for access to a greater amount of user input data which in turn improves the quality of recommendations. In the skateboarding example above, the amount of data solely within the shopping domain with regard to skateboarding might be too minimal to allow for quality recommendations. This might also be true within the news and movies domains, when looked at individually. But by allowing for data to be combined across these domains, this pattern of skateboarding correlation can be found and used in recommendations that otherwise would not be possible.

A method for generating recommendations across multiple product or service domains includes collecting user events across a plurality of product or service domains in a database, receiving a triggering event for recommendations, analyzing the user events to formulate correlations between the user events in the database, and generating recommendations in response to the triggering event in accordance with the correlations between the user events in the database.

A system for generating recommendations across multiple product or service domains includes a plurality of domain servers for handling user events and for interfacing with users via the Internet, a database for storing the user events, and a recommendation engine. The recommendation engine further includes one or more computer programs containing instructions for collecting the user events across a plurality of product or service domains in the database, receiving a triggering event for recommendations, analyzing the user events to formulate correlations between the user events in the database, and generating recommendations in response to the triggering event in accordance with the correlations between the user events in the database.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the following drawings.

Like numbers are used throughout the figures.

DESCRIPTION OF EMBODIMENTS

Figure 1:
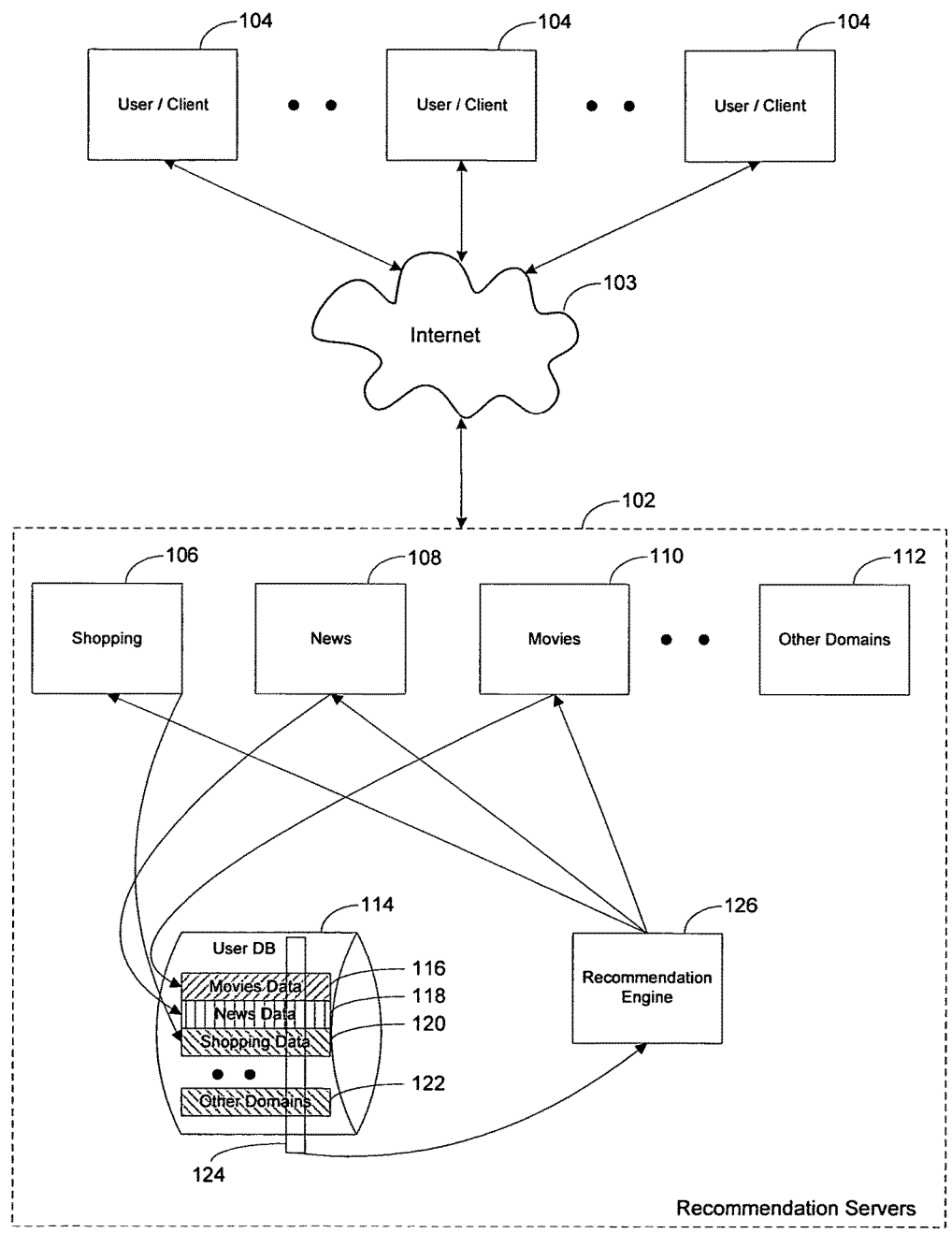
FIG. 1 illustrates a cross-domain recommendation system according to an embodiment of the present invention.

FIG. 1 illustrates a cross-domain recommendation system according to an embodiment of the present invention. The recommendation system includes one or more recommendation servers 102, and one or more clients 104. The recommendation servers 102 interface with the clients 104 via the Internet 103. The recommendation servers further include a plurality of individual domains, for example, shopping domain 106, news domain 108, movies domain 110 and other domains 112.

A domain is a computer system implemented with different hardware and software for a specific application, such as the shopping application 106, news application 108, and movie application 110. Users' interactions with each particular domain, also referred to as user events, are saved and updated in the user database 114. The user database 114 comprises storage for data collected from each individual domain, for example movies data 116, news data 118, shopping data 120 and other domain data 122. A user 104 may have multiple user interactions with all of the domains. In addition, a domain can be more generally defined as a category of information. For example, different domains can include demographic information (age, race, job, education level, etc.), behavioral information (hours of internet use, variety of websites used, number of computers used to access the internet, etc.), and computer system information (internet connection capacity, multimedia system capabilities, browser version, etc.).

The recommendation servers 102 further includes a recommendation engine 126. As will be described in the following sections, the recommendation engine 126 analyzes portions of the user database 114 across domains in response to a specific user event to find correlations across domains for producing recommendations. The recommendation engine 126 processes a data slice 124 from the various domains, for example movie data 116, news data 118, shopping data 120 and other domain data 122. Note that the user events stored in different domains can have different type, value, and structure. The recommendation engine 126 then finds correlations between the user events, and formulates its recommendations based on the correlations between the user events.

Collecting User Events

Recommendations from collaborative filtering are derived from analysis of user behavior. This user behavior is represented in the user database 114 as user events. Storing these user events from multiple domains is more complex than from just a single domain because the data format from each domain may be different. The user events that are stored in the user database 114 are diverse given the diversity of the domains from which they are collected. Types of events from the shopping domain 106, for example, may include browsing products, purchases, or returns. In news domain 108 event types may include viewing titles, viewing summaries, or viewing entire news articles. In movie domain 110 event types would include scoring and reviewing movies, or purchasing online movie tickets.

In addition to the variety of types of events, there is a variety of event values for a given event:
  numerical values—scores and ranks for movies, songs, and etc.
  ordinal values—text values that have an ordered scale, for example, high, medium, low
  free text—reviews, opinions
  nominal values—everything not included above, usually a set of one or more labels, for example, (on, off), (emailed, messaged, phoned)

The user database 114 supporting cross-domain recommendations is capable of storing this variety of event values. In addition, the user database 114 for storing user events from multiple domains is organized across multiple domains as illustrated in FIG. 2B below. In many organizations, the domains are managed by different teams of individuals. The aggregation of data from multiple domains by the disclosed recommendation system is coordinated and synchronized across diverse teams of people in different geographical locations. Furthermore, any ongoing changes in the recommendation system are dynamically updated. In other words, changes in all domains are accommodated by this centralized user database 114. The set of domains, products, services, users, and attributes of the user events may be changed constantly. As discussed below, the invention provides support for this dynamic aspect of the user database.

Figure 2A:
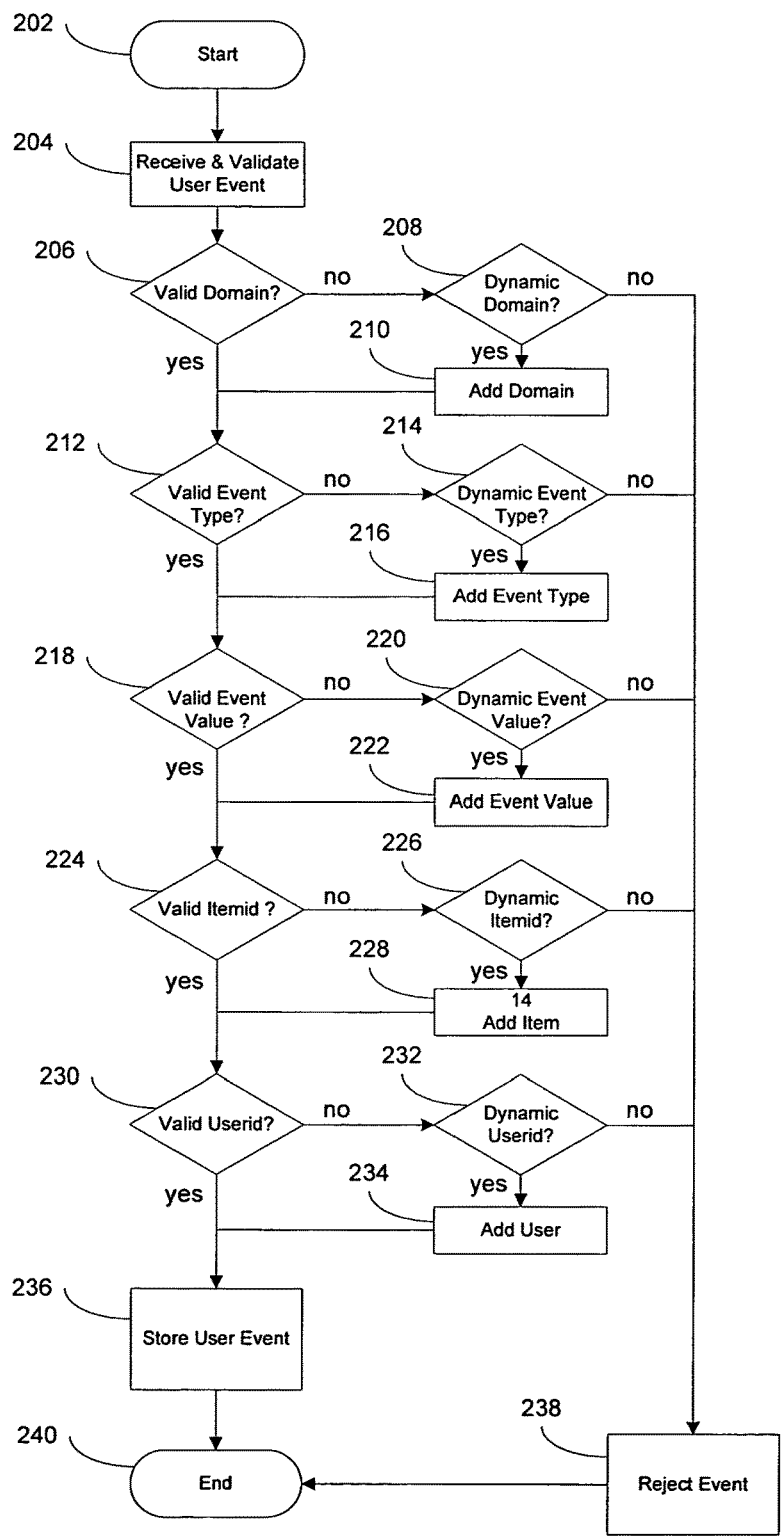
FIG. 2A illustrates a method for collecting user events in the user database 114 of FIG. 1 according to an embodiment of the present invention.
Figure 2B:
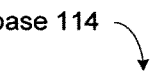
FIG. 2B illustrates a method for analyzing user events in the user database 114 of FIG. 1 according to an embodiment of the present invention.

FIG. 2A illustrates a method for collecting user events in the user database 114 of FIG. 1 according to an embodiment of the present invention. A user event is described by the following input parameters:
  userid—unique identifier for a specific user
  domain—business, property or system generating the event, e.g., shopping, news, movies
  itemid—unique identifier for a specific item or product within the domain
  event type—the type of event being stored, e.g., purchase, score, review
  event value—the user's input for the given domain, item, and event type The method starts in step 202 and thereafter moves to step 204 where the method receives a user event to be stored and determines if this is a valid user event. If it is not a valid event, then the method determines whether it should be rejected or the database should be extended. If the event is not rejected then the database is updated to reflect the new user event.

In step 206, an evaluation is made as to whether the event's domain is valid. If the domain is valid (206_yes), then the method continues in step 212. If not (206_no), in step 208 the recommendation system's configuration is checked to determine if the database can be updated dynamically when new domains are received. If dynamic domain updates are not enabled, the method moves to step 238 where the event is rejected. Else if dynamic domain updates are enabled, the domain is added to the set of valid domains in step 210 and the method continues in step 212.

In step 212, the method checks if the event type is valid. If it is valid (212_yes), then the method continues in step 218. If the event type is not valid (212_no), the method checks if dynamic event type update is enabled in step 214. If dynamic event type update is not enabled (214_no), the method moves to step 238 and the event is rejected. Else if dynamic event type update is enabled (214_yes), the event type is added to the set of valid event types in step 216 and the method continues in step 218.

Next in step 218, the method checks if the event value is valid. If it is valid (218_yes), then the method continues in step 224. If the event value is not a valid (218_no), the method checks if dynamic event value update is enabled in step 220. If dynamic event value update is not enabled (220_no), the method moves to step 238 and the event is rejected. Else if dynamic event value update is enabled (220_yes), the event value is added to the set of valid event values in step 222 and the method continues in step 224. It is advantageous to have the flexibility to accept the variety of event values dynamically. For example, for the domain "Personals" and the event type "Method of Contact" the known values might be "(email, voicemail, pager)". As the Personals product changes, a new method of contacting other people may be added, such as "webcam". As users take advantage of this new feature, new user events will be generated with the value "webcam" for "Method of Contact". If dynamic event value update is enabled, the system can accept this user event and continue. This method allows the system to automatically grow and change along with the individual domain applications and teams.

In step 224, the method checks if the itemid is valid. If it is valid (224_yes), then the method continues in step 224. If the itemid is not a valid (224_no), the method checks if dynamic itemid update is enabled in step 226. If dynamic itemid update is not enabled (226_no), the method moves to step 238 and the event is rejected. Else if dynamic itemid update is enabled (226_yes), the itemid is added to the set of valid itemids in step 228 and the method continues in step 230. Similar to the flexibility described above for event values, this flexibility for dynamically updating itemid allows the system to automatically handle changes in product inventory that are inevitable in most business applications. In some applications, the ability to disable dynamic itemid update is essential. For example, if it is desired to only generate recommendations on a subset of items, then only those items can be allowed in the list of valid itemids. Disabling dynamic itemid update prevents the undesired items from creeping into the pool of candidate recommendations. In order to maintain the uniqueness of itemids across all domains, itemids are checked for validity only within the domain from which it is originated. This allows each domain (team, property, application) to maintain their own processes for item identification without concern of name space conflict with other domains.

In step 230, the method checks if the userid is valid. If it is valid (230_yes), then the method continues in step 236. If the userid is not valid (230_no), the method checks if dynamic userid update is enabled in step 232. If dynamic userid update is not enabled (232_no), the method moves to step 238 and the event is rejected. Else if dynamic userid update is enabled (232_yes), the userid is added to the set of valid userids in step 234 and the method continues in step 236. Similar to the flexibility described above for itemids, the ability to automatically expand the database to store events for new users is essential in most Internet applications where the user population changes everyday. However, the flexibility to restrict these updates can also be beneficial, for example in the case where users' events should not be stored unless they have agreed to the terms of service.

In step 236, the user event is stored to the user database 114, and the method ends in step 240.

Analyzing User Events

FIG. 2B illustrates a method for analyzing user events in the user database 114 of FIG. 1 according to an embodiment of the present invention. As shown in FIG. 2B, the user database 114 is represented as a multidimensional array where each user is represented in one or more rows with each row containing a particular user event.

Using the skateboarding example above, the first user event collected is that User 1 has viewed an entire news article about skateboarding. The event value in this case is a nominal value ("yes"). The second event is User 1 has rated a skateboarding movie with a rating of 80. The event value is an ordinal value, in this case an integer between 0 and 100, inclusive. The third event is User 1 has subsequently written a review of this movie. The event value in this case is free text. The fourth event is User 1 has purchased a skateboard. In this case the event value is an ordinal which reflects the amount paid for the item. And subsequently the fifth event shows a rating for these skateboarding items. The event value in this case is an ordinal, "high" on the scale of "low", "medium", and "high".

There are many collaborative filtering algorithms that can be employed to find correlations between user events. In one embodiment of the present invention, the Affinity Engine described in U.S. patent application Ser. No. 10/417,709, filed Apr. 16, 2003, entitled Affinity Analysis Method and Article of Manufacture, is used to find correlations between user events. This U.S. patent application Ser. No. 10/417,709, is expressly incorporated herein by this reference. The Affinity Engine processes portions of the user database 114 across multiple domains collected over the entire user population to determine the correlations between user events, such as between the user events of User 1 and other users in the user database. Correlation values are assigned to indicate the weight of relationship between canonical user events, and the correlation values are stored in a similarity database. These correlation values are then used to generate recommendations to subsequent users who demonstrate similar user behaviors. For example, if User 2 has also viewed the same entire news article about skateboarding, rated and written a review of the same skateboarding movie, then a recommendation may be generated to User 2 for purchasing certain skateboards based on the collective canonical user events exhibited by other users in the user population, such as the canonical user events of User 1. Note that the disclosed invention is independent of the collaborative filtering algorithm used for computing the correlation values between user events. Recognizing that certain types of filtering algorithms may be more suited for filtering certain types of user events, the disclosed invention supports integration of any collaborative filtering algorithm as a plug-in component to the recommendation system.

Recommending Similar Items

Similarities between items provide possible criteria for making recommendations. Often people find books to read that are considered similar to other books they have enjoyed. This extends to other domains: movies, songs, clothes, games, and other products and services. Items are considered similar if they are alike, or more explicitly if they have similar values across their attributes. For example, in the case of books the attributes may be author, fiction or non-fiction, genre, and character development. Different approaches exist for computing recommendations based on item similarities.

Figure 3:
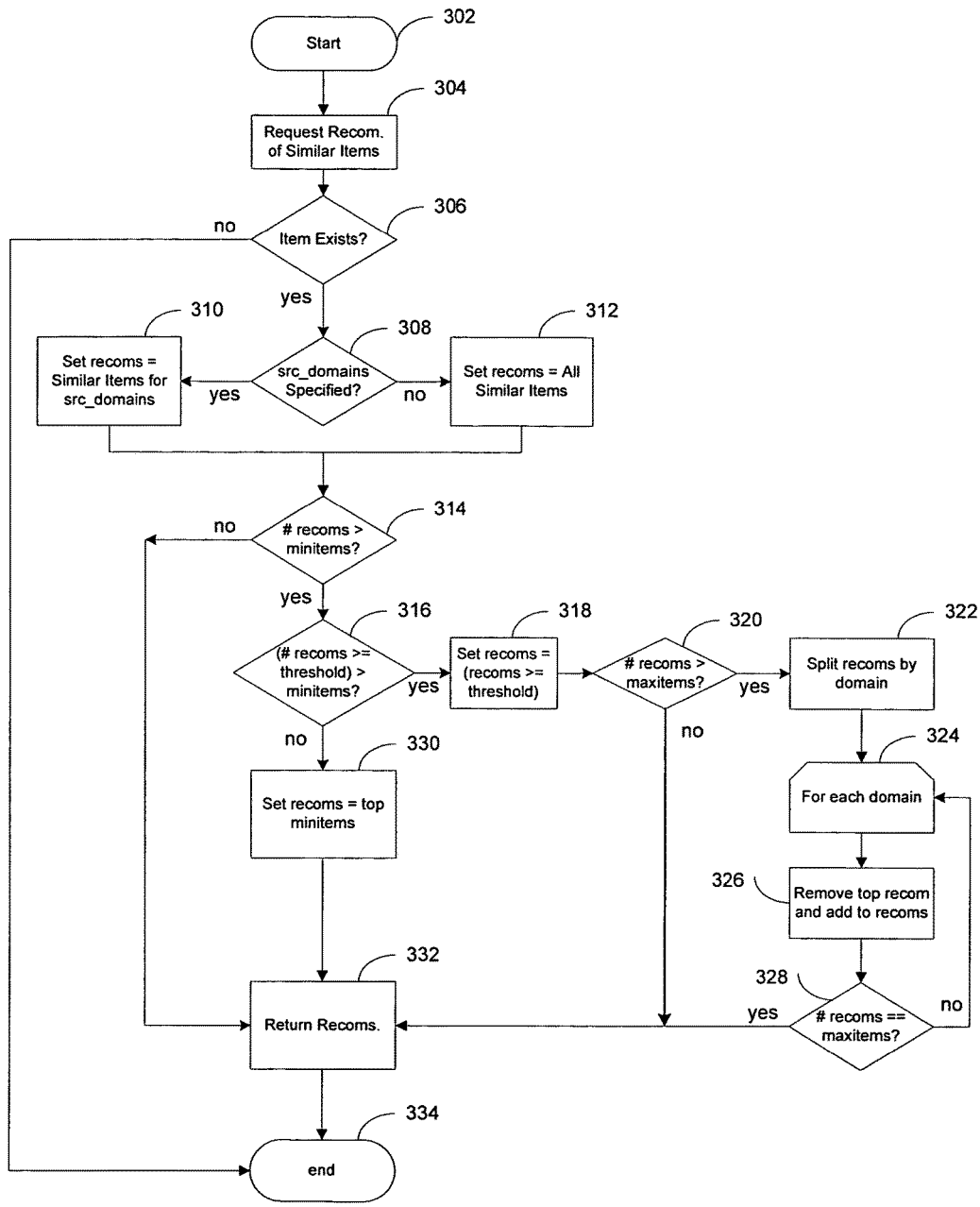
FIG. 3 illustrates a method for generating recommendations of similar items according to an embodiment of the present invention.

In one embodiment of the present invention as illustrated in FIG. 3, the method provides a way to use these item similarities in the context of cross-domain recommendations. A triggering event, such as a user request, for similar item recommendations comprises the following input parameters:

domain—business, property or system containing the item for which similar item recommendations are being requested, e.g., shopping, news, movies itemid—unique identifier for a specific item or product within the domain threshold—the minimum level of similarity a recommended item must have minitem—the minimum number of recommended items desired maxitem—the maximum number of recommended items desired src_domains—the domain(s) from which recommended items should belong The method finds similar items across all desired domains and returns a list of recommended items according to a set of predefined constraints.

FIG. 3 illustrates a method for generating recommendations of similar items by the recommendation engine 126 according to an embodiment of the present invention. The method starts in step 302 and thereafter moves to step 304 where the method receives a triggering event, such as a user request, for recommendations of other items similar to a designated item. In step 306, a determination is made as to whether the designated item exists in the user database 114. If the designated item does not exist (306_no), then the method ends in step 334 and no recommendations are generated. Else if the designated item does exist (306_yes), the method continues in step 308. Determination of whether the designated item exists is based on whether there are any items considered similar to this designated item. The lack of similar items has two possible causes: 1) this is a new item that did not previously exist; 2) this designated item has existed prior to the request, but not enough user events are associated with this designated item on which to base recommendations.

Next in steps 308 through 312, a set of unrestricted similar items is retrieved; this set is also referred to as the first list of recommendations. The set of unrestricted similar items depends on whether the src_domains input parameter is specified. If src_domains is specified (308_yes), the set of similar items is drawn from only the domains indicated by the src_domains in step 310. If src_domains is not specified (308_no), the set of similar items is drawn from all domains in step 312.

Given the first list of recommendations of similar items, a predefined set of constraints, including domain, threshold, minitem and maxitem, are applied to improve the cross-domain recommendations. In step 314, a determination is made as to whether the number of items in the first list of recommendations is greater than the predefined minitem. If the outcome of the determination is negative (314_no), the first list of recommendations is returned in step 332. Else if the outcome of the determination is positive (314_yes), the method continues in step 316.

In step 316, a second list of recommendations is formed from the first list of recommendations. The second list of recommendations is a subset of the first list of recommendations comprising similar items having a correlation value above the predefined threshold. Another determination is made as to whether the number of items in the second list of recommendations is greater than the minitem. If the number of items in the second list of recommendations is not greater than the minitem (316_no), then in step 330, the method selects minitem number of recommendations in descending order of correlation value from the first list of recommendations to form a third list of recommendations, and the method returns the third list of recommendations in step 332. In this situation, one or more of the items recommended may have a correlation value below the threshold, but they are returned nonetheless to meet the minitem constraint. It is advantageous to present to users the number of items requested in many common computer and internet applications. In the alternative, if the number of items in the second list of recommendations is greater than minitem (316_yes), then the second list of recommendations is retained in step 318 for further processing in steps 320 to 328.

In step 320, the maxitem constraint is taken into consideration. A determination is made as to whether the number of items in the second list of recommendations is greater than the maxitem constraint. If the outcome is no (320_no), then the second list of recommendations is returned in step 332. This path returns a list of recommended similar items that meet or exceed the threshold, and the number of recommended items is greater than the minimum number of items requested but less than or equal to the maximum number of items requested. In the alternative (320_yes), after applying the similarity threshold constraint if the number of items in the second list of recommendations is still more than the maximum desired number of items, the method continues in step 322 to improve the second list of recommendations by spreading the recommended items across the set of domains from which they have been drawn.

In step 322, the candidate items are separated into domain groups in accordance with the predefined src_domains parameter. In steps 324 to 328, the method employs a round-robin scheme and traverses each group one at a time (step 324). In step 326, the method selects a recommendation having the highest correlation value to form a fourth list of recommendations (step 326). One skilled in the art will recognize that other priority schemes may be employed in the selection process. The steps 324 and 326 are repeated until the number of items in the fourth list of recommendations is equal to the predefined maxitem. The final outcome is the fourth set of recommendations that are similar to the requested item. This fourth set of recommendations meets the minitem and maxitem constraints, as well as the similarity threshold if enough similar items exist. The set of recommended items also reflect an even selection across the specified domains. In step 332, the fourth list of recommendations is returned. The method ends in step 334.

Recommending Personalized Items

Figure 4:
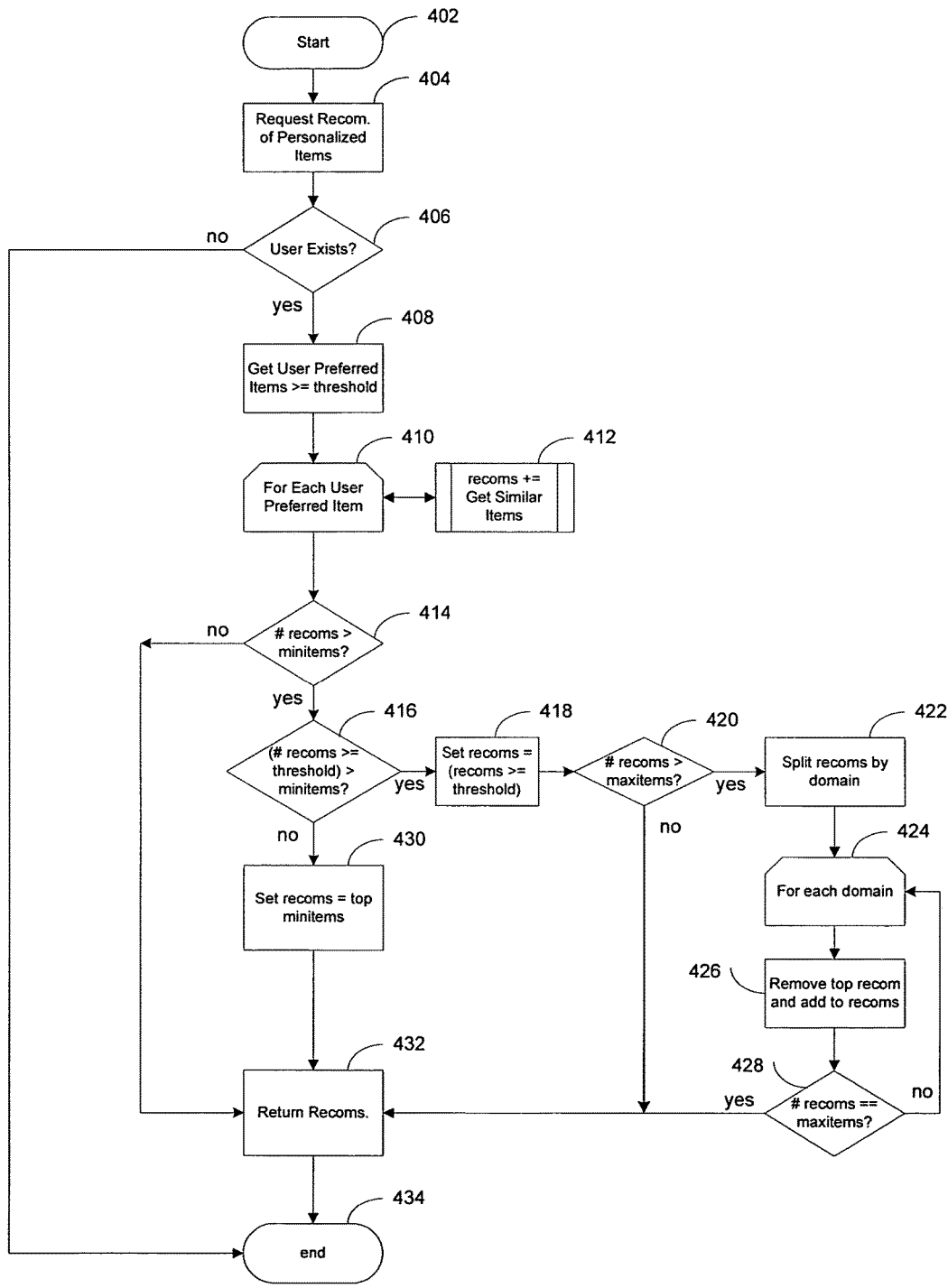
FIG. 4 illustrates a method for generating personalized recommendations according to an embodiment of the present invention.

Recommending similar items can be further improved by taking into consideration the history of a user's personal preferences. Personalized recommendations are made by finding items similar to those items preferred by a given individual in accordance with the history of the user's personal preferences. FIG. 4 illustrates a method for generating personalized recommendations according to an embodiment of the present invention. The method finds personalized recommendations across all desired domains and returns a list of personalized recommendations according to a set of predefined parameters. A triggering event, such as a user request, for personalized recommendations comprises the following input parameters:

userid—unique identifier for a specific user threshold—the minimum level of similarity a recommended item must have minitem—the minimum number of recommended items desired maxitem—the maximum number of recommended items desired src_domains—the domain(s) from which recommended items should belong The method starts in step 402 and thereafter moves to step 404 where the method receives a triggering event for personalized recommendations. In step 406, a first determination is made as to whether the user exists. If the user does not exist (406_no), the method ends in step 434 and no personalized recommendations are generated. In the alternative, if the user exists (406_yes), the method continues in step 408. Determination of whether the user exists is based on whether there are any user events in the user database 114. In step 408, a first list of items that the user has shown a proclivity for or has shown preference is retrieved. The first list of items is also at or above the predefined threshold.

These preferred items are used as the basis for finding personalized recommendations. In steps 410 and 412, for each preferred item (step 410), a set of similar items is retrieved (step 412). The method for finding similar items is described above in association with FIG. 3. The following input parameters are used in the process for getting similar items: threshold, minitem, maxitem, and src_domains. The itemid and domain input parameters for getting similar items are derived from each item in the preferred item list. In step 412, the union of similar items retrieved for each preferred item is stored in a first list of personalized recommendations for subsequent steps.

Given the first list of personalized recommendations, a predefined set of constraints, including domain, threshold, minitem and maxitem, are applied to improve the cross-domain recommendations. In step 414, a determination is made as to whether the number of items in the first list of recommendations is greater than the predefined minitem. If the outcome of the determination is negative (414_no), the first list of recommendations is returned in step 432. Else if the outcome of the determination is positive (414_yes), the method continues in step 416.

In step 416, a second list of recommendations is formed from the first list of recommendations. The second list of recommendations is a subset of the first list of recommendations comprising items having a correlation value above the predefined threshold. Another determination is made as to whether the number of items in second list of recommendations is greater than the minitem. If the number of items in the second list of recommendations is not greater than the minitem (416_no), then in step 430, the method selects minitem number of recommendations in descending order of correlation value from the first list of recommendations to form a third list of recommendations, and the method returns the third list of recommendations in step 432. In this situation, one or more of the items recommended may have a correlation value below the threshold, but they are returned nonetheless to meet the minitem constraint. It is advantageous to present to users the number of items requested in many common computer and internet applications. In the alternative, if the number of items in the second list of recommendations is greater than minitem (416_yes), then the second list of recommendations is retained in step 418 for further processing in steps 420 to 428.

In step 420, the maxitem constraint is taken into consideration. A determination is made as to whether the number of items in the second list of recommendations is greater than the maxitem constraint. If the outcome is no (420_no), then the second list of recommendations is returned in step 432. This path returns a list of recommended items that meet or exceed the threshold, and the number of recommended items is greater than the minimum number of items requested but less than or equal to the maximum number of items requested. In the alternative (420_yes), after applying the similarity threshold constraint if the number of items in the second list of recommendations is still more than the maximum desired number of items, the method continues in step 422 to improve the second list of recommendations by spreading the recommended items across the set of domains from which they have been drawn.

In step 422, the candidate items are separated into domain groups in accordance with the predefined src_domains parameter. In steps 424 to 428, the method employs a round-robin scheme and traverses each group one at a time (step 424). In step 426, the method selects a recommendation having the highest correlation value to form a fourth list of recommendations. One skilled in the art will recognize that other priority schemes may be employed in the selection process. The steps 424 and 426 are repeated until the number of items in the fourth list of recommendations is equal to the predefined maxitem. The final outcome is the fourth set of recommendations that are personalized to the user's preferred items. This fourth set of recommendations meets the minitem and maxitem constraints, as well as the threshold of correlation value if enough personalized items exist. The set of recommended items also reflect an even selection across the specified domains. In step 432, the fourth list of recommendations is returned. The method ends in step 434.

The disclosed system for generating recommendations offers a number of improvements over the existing systems. Specifically, the disclosed system generates better and more relevant recommendations by taking into consideration user input data across multiple domains. This capability of generating better recommendations in turn enables better user experience and provides a broader range of products or services to users.

One skilled in the relevant art will recognize that there are many possible modifications of the disclosed embodiments that could be used, while still employing the same basic underlying mechanisms and methodologies. For example, different sets of constraints, such as demographic information of a user, may be used in improving the recommendations. Different priority schemes may be employed in place of the round-robin scheme disclosed in one embodiment of the present invention. And different algorithms may be used to compute the correlation values between user input data across multiple domains.

The foregoing description, for purpose of explanation, has been described with references to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising:
receiving, at a domain server, data associated with a user event corresponding to a web page that is associated with a domain hosted by said domain server, the web page displaying interactive information accessible via a displayed user interface associated with a hosted media rendering application specific to the web page, the user event comprising information corresponding to a user interaction on said web page via a media rendering application, the information for each user event comprising parameters associated with a user identifier, an item identifier of an item on the web page identified from said user interaction, a type of said user interaction performed by said media rendering application, and a corresponding event value of said interaction;

automatically evaluating, via the domain server, the user event information for each user event based on each of the parameters, said evaluation comprising validating each parameter according to stored information associated with the media rendering application, said validation comprising analyzing each parameter in order to verify that the user event is enabled to be performed by the domain server on the web page at a time of said reception of the user event based on dynamically updated functionality of the media rendering application;

automatically storing, via the domain server in an associated database, upon validating the user event parameters, the information associated with said user event, said storage comprising creating data entries in the database for each parameter as an associated set of information for the user event and said web page;

upon storing said user event information, identifying, via the domain server, a digital content object comprising a similar context and functionality to that of the item identified within said user event parameters; and automatically communicating, via the domain server, said digital content object to said user, said communication causing said web page to render the digital content object via the media rendering application when said user is viewing said web page.

2. The method of claim 1, further comprising:
receiving data associated with a plurality of user events corresponding to a plurality of web pages hosted by the domain server, each web page comprising a specific media rendering application, each user event comprising parameters associated with a user identifier, an item identifier of an item on a web page, a type of user interaction performed by a media rendering application, and a corresponding event value.

3. The method of claim 2, further comprising:
applying a collaborative filter to the plurality of received user events, said applied collaborative filter resulting in a computation of correlation values between parameters of each user event; and
storing the correlation values in a similarity database.

4. The method of claim 3, further comprising:
receiving a request for recommending personalized items; and
generating personalized recommendations in accordance with the at least one correlation between the at least two user interactions.

5. The method of claim 1, further comprising:
receiving a request for content, wherein the request includes a set of predefined parameters; and
validating the request parameters, wherein when a source domain is specified in the request, generating a first list of recommendations in accordance with the source domain, and wherein when the source domain is not specified in the request, generating the first list of recommendations in accordance with a source domain parameter in the database.

6. The method of claim 1, further comprising:
determining whether dynamic updating of functionality parameters of the web page media rendering application is enabled,
wherein if the dynamic updating is enabled, automatically adding a new functionality parameter to a database, said new functionality parameter associated with functionality of the media rendering application, and updating the database to validate the new functionality parameter when it is included in another user event.

7. The method of claim 1, wherein said validation further comprises:
validating the domain of the user event;
validating the event type;
validating the event value;
validating the identifier of the item; and
validating the user identifier.

8. The method of claim 3, further comprising:
generating and communicating recommendations of similar items to said items in accordance with a priority scheme and across said domains.

9. The domain server of claim 1, further comprising:
logic executed by the processor for receiving a request for content, wherein the request includes a set of predefined parameters; and
logic executed by the processor for validating the request parameters, wherein when a source domain is specified in the request, generating a first list of recommendations in accordance with the source domain, and wherein when the source domain is not specified in the request, generating the first list of recommendations in accordance with a source domain parameter in the database.

10. The domain server of claim 1, further comprising:
logic executed by the processor for determining whether dynamic updating of functionality parameters of the web page media rendering application is enabled,
wherein if the dynamic updating is enabled, automatically adding a new functionality parameter to a database, said new functionality parameter associated with functionality of the media rendering application, and updating the database to validate the new functionality parameter when it is included in another user event.

11. The domain server of claim 1, wherein said validation further comprises:
logic executed by the processor for validating the domain of the user event;
logic executed by the processor for validating the event type;
logic executed by the processor for validating the event value;
logic executed by the processor for validating the identifier of the item; and
logic executed by the processor for validating the user identifier.

12. The non-transitory computer-readable storage medium of claim 1, further comprising:
receiving data associated with a plurality of user events corresponding to a plurality of web pages hosted by the domain server, each web page comprising a specific media rendering application, each user event comprising parameters associated with a user identifier, an item identifier of an item on a web page, a type of user interaction performed by a media rendering application, and a corresponding event value;
applying a collaborative filter to the plurality of received user events, said applied collaborative filter resulting in a computation of correlation values between parameters of each user event;

storing the correlation values in a similarity database;
receiving a request for recommending personalized items; and
generating personalized recommendations in accordance with the at least one correlation between the at least two user interactions.

13. The non-transitory computer-readable storage medium of claim 1, further comprising:
determining whether dynamic updating of functionality parameters of the web page media rendering application is enabled,
wherein if the dynamic updating is enabled, automatically adding a new functionality parameter to a database, said new functionality parameter associated with functionality of the media rendering application, and updating the database to validate the new functionality parameter when it is included in another user event.

14. The non-transitory computer-readable storage medium of claim 12, further comprising:
generating and communicating recommendations of similar items to said items in accordance with a priority scheme and across said domains.

15. A domain server comprising:
a processor;
a non-transitory computer-readable storage medium for tangibly storing thereon program logic for execution by the processor, the program logic comprising:
logic executed by the processor for receiving, at the domain server, data associated with a user event corresponding to a web page that is associated with a domain hosted by said domain server, the web page displaying interactive information accessible via a displayed user interface associated with a hosted media rendering application specific to the web page, the user event comprising information corresponding to a user interaction on said web page via a media rendering application, the information for each user event comprising parameters associated with a user identifier, an item identifier of an item on the web page identified from said user interaction, a type of said user interaction performed by said media rendering application, and a corresponding event value of said interaction;
logic executed by the processor for automatically evaluating, via the domain server, the user event information for each user event based on each of the parameters, said evaluation comprising validating each parameter according to stored information associated with the media rendering application, said validation comprising analyzing each parameter in order to verify that the user event is enabled to be performed by the domain server on the web page at a time of said reception of the user event based on dynamically updated functionality of the media rendering application;
logic executed by the processor for automatically storing, via the domain server in an associated database, upon validating the user event parameters, the information associated with said user event, said storage comprising creating data entries in the database for each parameter as an associated set of information for the user event and said web page;
logic executed by the processor for upon storing said user event information, identifying, via the domain server, a digital content object comprising a similar context and functionality to that of the item identified within said user event parameters; and
logic executed by the processor for automatically communicating, via the domain server, said digital content object to said user, said communication causing said web page to render the digital content object via the media rendering application when said user is viewing said web page.

16. The domain server of claim 15, further comprising:
logic executed by the processor for receiving data associated with a plurality of user events corresponding to a plurality of web pages hosted by the domain server, each web page comprising a specific media rendering application, each user event comprising parameters associated with a user identifier, an item identifier of an item on a web page, a type of user interaction performed by a media rendering application, and a corresponding event value.

17. The domain server of claim 16, further comprising:
logic executed by the processor for applying a collaborative filter to the plurality of received user events, said applied collaborative filter resulting in a computation of correlation values between parameters of each user event; and
logic executed by the processor for storing the correlation values in a similarity database.

18. The domain server of claim 17, further comprising:
logic executed by the processor for receiving a request for recommending personalized items; and
logic executed by the processor for generating personalized recommendations in accordance with the at least one correlation between the at least two user interactions.

19. The domain server of claim 17, further comprising:
logic executed by the processor for generating and communicating recommendations of similar items to said items in accordance with a priority scheme and across said domains.

20. A non-transitory computer-readable storage medium tangibly storing thereon computer-executable instruction, that when executed by a processor associated with a domain server, perform a method comprising:
receiving, at the domain server, data associated with a user event corresponding to a web page that is associated with a domain hosted by said domain server, the web page displaying interactive information accessible via a displayed user interface associated with a hosted media rendering application specific to the web page, the user event comprising information corresponding to a user interaction on said web page via a media rendering application, the information for each user event comprising parameters associated with a user identifier, an item identifier of an item on the web page identified from said user interaction, a type of said user interaction performed by said media rendering application, and a corresponding event value of said interaction;
automatically evaluating, via the domain server, the user event information for each user event based on each of the parameters, said evaluation comprising validating each parameter according to stored information associated with the media rendering application, said validation comprising analyzing each parameter in order to verify that the user event is enabled to be performed by the domain server on the web page at a time of said reception of the user event based on dynamically updated functionality of the media rendering application;

automatically storing, via the domain server in an associated database, upon validating the user event parameters, the information associated with said user event, said storage comprising creating data entries in the database for each parameter as an associated set of information for the user event and said web page;

upon storing said user event information, identifying, via the domain server, a digital content object comprising a similar context and functionality to that of the item identified within said user event parameters; and automatically communicating, via the domain server, said digital content object to said user, said communication causing said web page to render the digital content object via the media rendering application when said user is viewing said web page.

* * * * *